United States Patent [19]

Kiya et al.

[11] Patent Number: 4,680,697
[45] Date of Patent: Jul. 14, 1987

[54] NUMERICAL CONTROL SYSTEM

[75] Inventors: Nobuyuki Kiya, Hachioji; Motoaki Yoshino, Suginami, both of Japan

[73] Assignee: Fanuc Ltd., Minamitsuru, Japan

[21] Appl. No.: 739,672

[22] PCT Filed: Jan. 26, 1985

[86] PCT No.: PCT/JP85/00032
§ 371 Date: May 31, 1985
§ 102(e) Date: May 31, 1985

[87] PCT Pub. No.: WO85/03366
PCT Pub. Date: Aug. 1, 1985

[30] Foreign Application Priority Data

Jan. 26, 1984 [JP] Japan ................................ 59-012428

[51] Int. Cl.$^4$ .................... G06F 15/46; G05B 19/18
[52] U.S. Cl. .................................. 364/171; 318/568; 364/191; 364/474
[58] Field of Search .............................. 364/167–171, 364/191–193, 474, 475; 318/568

[56] References Cited

U.S. PATENT DOCUMENTS

| | | | |
|---|---|---|---|
| 4,092,720 | 5/1978 | Carey | 364/474 |
| 4,184,911 | 1/1980 | Koda et al. | 159/47.1 |
| 4,328,448 | 5/1982 | Berenberg et al. | 364/474 X |
| 4,490,781 | 12/1984 | Kishi et al. | 364/171 X |
| 4,556,957 | 12/1985 | Ichikawa | 364/474 X |
| 4,591,968 | 5/1986 | Nozawa et al. | 364/474 X |

*Primary Examiner*—Joseph Ruggiero
*Attorney, Agent, or Firm*—Staas & Halsey

[57] ABSTRACT

A numerical control system wherein operation information is output in the form of a numeric code by numeric keys (KEY) disposed on a numerical control operator's panel (MDI). A numerical control unit (OPCN) into which the numeric code has been fed converts the numeric code into a character using a code converter (CC) and displays the character on a display unit (CRT). The operation information displayed on the display unit (CRT) is stored in an operation information memory (OIM), and the numerical control unit (OPCN) performs numerical control processing based on the stored operation information.

9 Claims, 15 Drawing Figures

Fig. 3(A) PRIOR ART
```
MODE : MDI ■ AUTO EDIT HNDL JOG ZRN
```
Fig. 3(B) PRIOR ART
```
HANDLE AXIS : ■ HX HZ
HANDLE X10  : ■ X1 X10
```
Fig. 3(C) PRIOR ART
```
RAPID OVRD : ■100% F0
JOG FEED   :  20 MM/MIN
           ▬▬▬▬▬▬▬▬ XXXXXXXXX
FEED OVRD  : 100%
           ▬▬▬▬▬▬▬▬ XXXX
```
Fig. 3(D) PRIOR ART
```
BLOCK DELETE : ■ OFF ON
SINGLE BLOCK : ■ OFF ON
MACHINE LOCK :   OFF ■ON
DRY RUN      : ■ OFF ON
```
Fig. 3(E) PRIOR ART
```
PROTECT KEY : ■ PROTECT RELEASE
```
Fig. 3(F) PRIOR ART
```
FEED HOLD : ■ OFF ON
```
Fig. 4 PRIOR ART
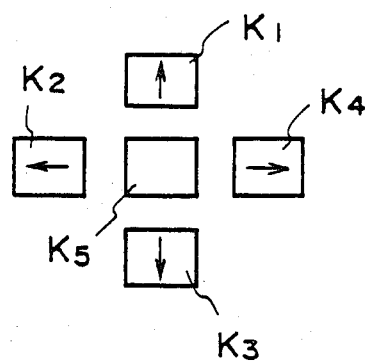
Fig. 5(A) PRIOR ART
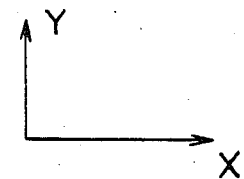
Fig. 5(B) PRIOR ART
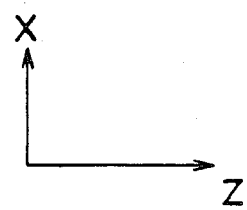

Fig. 7

```
OPERATOR'S PANEL              01234 N5678

SIGNAL 0    : ■OFF   ON
   SIGNAL 1    :  OFF  ■ON
   SIGNAL 2    :  OFF  ■ON
   SIGNAL 3    : ■OFF   ON
   SIGNAL 4    : ■OFF   ON
   SIGNAL 5    : ■OFF   ON
   SIGNAL 6    : ■OFF   ON
   SIGNAL 7    :  OFF  ■ON

ACTUAL POSITION (ABSOLUTE)
   x   123.456         z  - 456.789
                            AUTO
```

Fig. 8

| CHARACTER | CODE | COMMENT | CHARACTER | CODE | COMMENT | CHARACTER | CODE | COMMENT | CHARACTER | CODE | COMMENT |
|---|---|---|---|---|---|---|---|---|---|---|---|
| A | 065 | | 6 | 054 | | ア | 177 | | ム | 209 | |
| B | 066 | | 7 | 055 | | イ | 178 | | メ | 210 | |
| C | 067 | | 8 | 056 | | ウ | 179 | | モ | 211 | |
| D | 068 | | 9 | 057 | | エ | 180 | | ヤ | 212 | |
| E | 069 | | | 032 | SPACE | オ | 181 | | ユ | 213 | |
| F | 070 | | ! | 033 | EXCLAMATION POINT | カ | 182 | | ヨ | 214 | |
| G | 071 | | " | 034 | QUOTATION MARK | キ | 183 | | ラ | 215 | |
| H | 072 | | # | 035 | SHARP | ク | 184 | | リ | 216 | |
| I | 073 | | $ | 036 | DOLLAR SIGN | ケ | 185 | | ル | 217 | |
| J | 074 | | % | 037 | PERCENT | コ | 186 | | レ | 218 | |
| K | 075 | | & | 038 | AND | サ | 187 | | ロ | 219 | |
| L | 076 | | ' | 039 | APOSTROPHE | シ | 188 | | ワ | 220 | |
| M | 077 | | ( | 040 | LEFT PARENTHESIS | ス | 189 | | ヲ | 166 | |
| N | 078 | | ) | 041 | RIGHT PARENTHESIS | セ | 190 | | ン | 221 | |
| O | 079 | | * | 042 | ASTERISK | ソ | 191 | | ァ | 167 | |
| P | 080 | | + | 043 | PLUS SIGN | タ | 192 | | ィ | 168 | |
| Q | 081 | | , | 044 | COMMA | チ | 193 | | ゥ | 169 | |
| R | 082 | | - | 045 | MINUS SIGN | ツ | 194 | | ェ | 170 | |
| S | 083 | | . | 046 | PERIOD | テ | 195 | | ォ | 171 | |
| T | 084 | | / | 047 | SLASH | ト | 196 | | ャ | 172 | |
| U | 085 | | : | 058 | COLON | ナ | 197 | | ュ | 173 | |
| V | 086 | | ; | 059 | SEMICOLON | ニ | 198 | | ョ | 174 | |
| W | 087 | | < | 060 | LEFT ANGLE BRACKET | ヌ | 199 | | ッ | 175 | |
| X | 088 | | = | 061 | EQUAL SIGN | ネ | 200 | | ゛ | 222 | SONANT MARK |
| Y | 089 | | > | 062 | RIGHT ANGLE BRACKET | ノ | 201 | | ゜ | 223 | P-SOUND MARK |
| Z | 090 | | ? | 063 | QUESTION MARK | ハ | 202 | | 。 | 161 | PERIOD |
| 0 | 048 | | @ | 064 | COMMERCIAL "AT" MARK | ヒ | 203 | | 「 | 162 | LEFT QUOTATION MARK |
| 1 | 049 | | [ | 091 | LEFT SQUARE BRACKET | フ | 204 | | 」 | 163 | RIGHT QUOTATION MARK |
| 2 | 050 | | \ | 092 | | ヘ | 205 | | 、 | 164 | CONTINUATION MARK |
| 3 | 051 | | ¥ | 093 | YEN SYMBOL | ホ | 206 | | ・ | 165 | CENTERED PERIOD |
| 4 | 052 | | ] | 094 | RIGHT SQUARE BRACKET | マ | 207 | | | 000 | SPACE |
| 5 | 053 | | _ | 095 | UNDERLINE | ミ | 208 | | | | |

NUMERICAL CONTROL SYSTEM

BACKGROUND OF THE INVENTION

1. Field of the Invention

This invention relates to a numerical control system for a machine tool or the like and, more particularly, to a numerical control system for displaying, on the screen of a display unit, operation information entered by an operator's panel, and for performing numerical control on the basis of the displayed operation information.

2. Description of the Related Art

A numerical control unit executes predetermined numerical control processing on the basis of numerical control program data and operation information determined or set by an operator's panel. The operation information may include:

(1) mode information for specifying operating modes for editing, memory operation, tape operation, manual input operation, jog operation, handle feed operation and the like;
(2) single block on/off information;
(3) dry run on/off information;
(4) block delete on/off information;
(5) machine lock on/off information;
(6) feed hold on/off information;
(7) reference point return on/off information;
(8) jog feed direction information;
(9) jog feed velocity and overdrive information;
(10) handle axis selection information; and
(11) handle feed magnification information.

In the prior art, all these items of operation information are fed into the numerical control unit by setting switches, or by pressing buttons, which are provided on the operator's panel located on the machine side. However, such an arrangement results in a very large number of switches and buttons and makes operation a complicated matter. This invites operator error.

Accordingly, there has recently been proposed a numerical control system as shown in FIG. 1, in which a numerical control unit NC for numerically controlling a machine tool is provided with a numerical control operator's panel MDI, in addition to a machine operator's panel, as means for entering operation information. The necessary operation information is displayed on the screen of a display unit CRT of the numerical control operator's panel MDI, and desired operation information is selected and fed into the numerical control unit NC by operating keys or a light pen.

The method of setting and entering operation information in this numerical control system will now be described in conjunction with FIGS. 2 through 5.

FIGS. 2(A) and 2(B) are examples in which operation information is displayed on the screen of the display unit CRT of the numerical control operator's panel MDI unit and the operation information is set and entered by operating keys or light pen connected to the numerical control operator's panel MDI while the display is being viewed.

In FIG. 2(A), "MODE" denotes a mode information selection line. The arrangement is such that any one operating mode can be selected from among a manual input operation (MDI), automatic operation (AUTO: tape or memory operation), editing operation (EDIT), handle operation (HNDL), jog feed operating (JOG) and zero-point return operation (ZRN). For example, to select automatic operation (AUTO), the operator manipulates a horizontal shift key and a vertical shift key to position a cursor ( ) to the left of AUTO. If this is done, the automatic operating mode will be selected. Further, "HANDLE AXIS" represents a handle feed axis selection line, "HANDLE *10" represents a handle feed magnification selection line, "RAPID OVRD" denotes a rapid-traverse override setting line, and "FEED OVRD" denotes a feed velocity override setting line. It should be noted that selection of operation information is performed as in the case of the mode selection. Specifically, desired operation information is selected by the operator positioning the cursor at the head of the item of the selection line being displayed on the screen of the display unit CRT of the numerical control operator's panel MDI. The setting of an operation quantity on each of the setting lines is performed by the operator operating a horizontal shift key to extend bar graphs SG1 and SG2 to the right or left. That is, when the horizontal shift key is operated, the bar graph is elongated or contracted during operation of the key to set and display a quantity commensurate with the length of the bar graph. In FIG. 2(A), jog feed velocity (JOG FEED) is set to 20 mm/min, and feed override (FEED OVRD) is set to 100%.

In FIG. 2(B), "BLOCK DELETE" represents a block delete on/off selection line, "SINGLE BLOCK" a single block on/off selection line, "MACHINE LOCK" a machine lock on/off selection line, "DRY RUN" a dry run on/off selection line, "PROTECT KEY" a selection line for whether or not editing of data stored in memory is to be forbidden, and "FEED HOLD" a feed hold on/off selection line. The selection of operation information is performed by the operator positioning the cursor to the left of ON or OFF on each selection line. In the example of FIG. 2(B), the values block delete OFF, single block OFF, machine lock ON, protect key PROTECT and feed hold OFF have been set.

The foregoing is for a case where all operation information is entered using the screen of the display unit CRT. However, as shown in FIG. 3, an arrangement is permissible wherein the operation information is divided into a mode selection group [FIG. 3(A)], handle feed group [FIG. 3(B)], feed velocity related group [FIG. 3(C)], automatic operation related group [FIG. 3(D)], program protect group [FIG. 3(E)], feed hold group [FIG. 3(F)], and a jog feed related group (not shown), with only several of these groups being displayed on the screen of the display unit CRT and entered.

FIG. 4 is a view of an arrangement in which manual feed keys are provided on the numerical control operator's panel MDI. By operating keys K1 through K4, a machine tool or robot can be fed manually along a prescribed axis, and rapid traverse can be performed by operating a key K5 at the same time. Depending upon the machine tool, sometimes the axes of travel are the X and Y axes. For example, for a milling machine, the coordinate system is fixed as shown in FIG. 5(A), and for a lathe, the coordinate system is fixed as shown in FIG. 5(B). Accordingly, depending upon the machine tool used, the keys sometimes are for the +X axis, sometimes for the +Y axis and sometimes for the +Z axis.

In order to display the necessary operation information on the screen of the display unit CRT in the conventional numerical control operator's panel MDI, it is required that the operator's panel have input keys corresponding to various symbols. Specifically, the input keys necessary can include the letters of the alphabet, numerals, katakana (Japanese word symbols), upper and lower cases, percent (%), inequality symbols (>, <), space, etc. Although there are also instances where various symbols can be entered by the same key through use of a selection key, operation in this manner is troublesome because it is necessary to operate the selection key separately each time. Moreover, even though some symbols have a very low frequency of use, it is still necessary to provide the keys for these symbols. This increases the number of keys disposed on the operator's panel MDI, so the face of the operator's panel inevitably occupies a large space. Furthermore, the arrangement of the keys is complicated. This is undesirable in terms of both operability and appearance. In addition, there is the danger that the keys may be manipulated indiscriminately by an outsider, thereby resulting in erroneous operation.

Further, with the conventional numerical control system as shown in FIG. 1, the operator's panel on the machine side is provided with a mixture of operating members for controlling the machine tool through the numerical control unit NC and for controlling the machine tool directly without the intermediary of the numerical control unit NC. Consequently, the operator's panel on the machine side is complicated, invites erroneous operation and inevitably raises the cost of the numerical control system.

SUMMARY OF THE INVENTION

An object of the present invention is to provide a numerical control system in which it is possible to greatly reduce the number of keys disposed on the numerical control operator's panel and the number of switches disposed on the machine operator's panel, thereby resulting in a system having a simplified numerical control operator's panel and machine operator's panel, an enhanced space factor and excellent operability and appearance.

According to the present invention, the foregoing object is attained by providing a numerical control system having a numerical control unit for performing numerical control on the basis of operation information necessary for numerical control, the numerical control system performing:

(a) a first step in which the numerical control unit enters a character code of operation information output by using numeric keys provided on a numerical control operator's panel and converts the code into a character corresponding to the code;

(b) a second step in which the numerical control unit displays, on a display unit, the operation information converted into a character by the first step;

(c) a third step in which the numerical control unit stores, in an operation information memory, the operation information displayed by the second step; and (d) a fourth step in which the numerical control unit performs numerical control processing on the basis of the operation information stored by the third step.

Further, according to the present invention, there is provided a numerical control system for performing numerical control on the basis of operation information necessary for numerical control, the numerical control system having a numerical control operator's panel equipped with numeric keys for outputting operation information, a display unit for displaying, on a screen, operation information converted into a characters by a code converter of a numerical control unit having the code converter for entering, and for converting into a character, a numeric code of operation information output by the numerical control operator's panel, and an operation information memory for storing the operation information displayed on the display unit.

According to the invention, a code is entered by using numeric keys provided on a numerical control operator's panel, the code is converted into a character corresponding to the code, the character obtained by the conversion is displayed as operation information on a screen, and numerical control is performed based on the displayed operation information. Therefore, (1) the number of keys on the numerical control operator's panel can be greatly reduced and the space factor of the operator's panel can be improved, thereby resulting in a more compact operator's panel;

(2) the arrangement of the keys on the numerical control operator's panel can be simplified, operability enhanced and appearance improved; and (3) it is possible to prevent erroneous or accidental operation by the operator as well as indiscriminate operation of the numerical control unit by an outsider.

Further, according to the present invention, the greater part of the functions conventionally implemented by the operating members disposed on the machine-side operator's panel can be performed by the numerical control operator's panel. Therefore, (1) the machine operator's panel can be made very small and, hence, the area occupied thereby can be reduced, costs can be lowered, and erroneous operation can be prevented by reducing the number of operating members, and (2) since many control functions can be implemented in a limited amount of space by using mainly numeric keys on an NC operator's panel, an improvement in space factor can be achieved.

BRIEF DESCRIPTION OF THE DRAWINGS

FIGS. 2A–2B and 3A–3F are views showing examples of displays of operation information on the screen of a display unit;

FIG. 4 is a view showing an example of an arrangement of manual feed keys disposed on a numerical control operator's panel;

FIG. 5, including 5A and 5B, is a view for describing coordinate systems of machine tools;

FIG. 7 is a view showing an example of a display of operation information on the screen of a display unit according to the present invention; and FIG. 8 is a view showing an example of a character-code correspondence table.

DESCRIPTION OF THE PREFERRED EMBODIMENTS

To explain the present invention in greater detail, the invention will now be described in conjunction with FIGS. 6 through 8.

Figure 6:
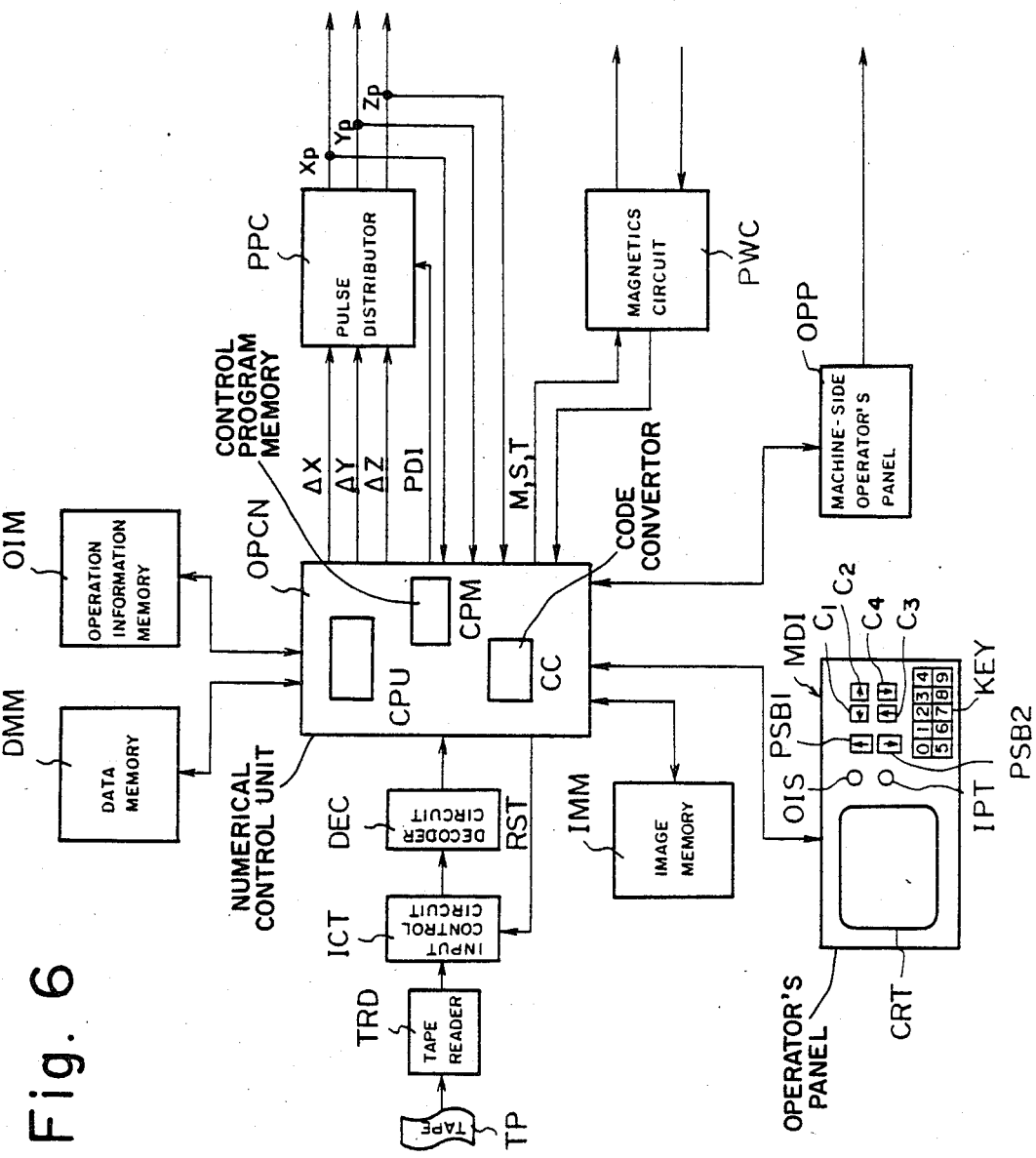
FIG. 6 is a block diagram illustrating an embodiment of a numerical control system according to the present invention

FIG. 6 is a block diagram illustrating an embodiment of a numerical control system according to the present invention. In the Figure, TP denotes an NC tape bearing a punched NC program comprising multiple items of numerical control data (NC data). TRD denotes a tape reader, and ICT an input control circuit which controls the tape reader TRD to read the NC data sequentially from the NC tape TP and input the data to a decoding circuit DEC, which is the next stage. The decoding circuit DEC decodes the read NC data and, if an item of NC data is a position command (Xe, Ye, Ze), a G-function instruction or the like, delivers the data to a numerical control unit OPCN, which is the next stage. If an item of NC data is an auxiliary (M), spindle speed (S) or tool (T) function instruction, the decoding circuit DEC and numerical control unit OPCN deliver the data to the machine side through a magnetics circuit PWC. The numerical control unit OPCN, which has a processor CPU, a control program memory CPM and a code converter CC, performs prescribed numerical control processing on the basis of numerical control program data input from the tape TP, and on the basis of operation information, described below. The numerical control unit OPCN also executes operation information input processing, described below.

MDI represents a numerical control operator's panel for inputting operation information to the numerical control unit OPCN. The panel has numeric keys, cursor keys C1, C2, C3, C4, page turning buttons PSB1, PSB2, an operation information setting key OIS, an input key IPT, and a display unit CRT. IMM denotes an image memory for storing operation information fed into the numerical control unit OPCN. OIM denotes an operation information memory comprising a battery-backed random-access memory (RAM) for storing operation information, specifically operation information entered using the display unit CRT and keys of the numerical control operator's panel MDI. DMM denotes a data memory for storing, e.g., the results of numerical control processing performed by the numerical control unit OPCN. It should be noted that the image memory IMM, operation information memory OIM and data memory DMM may be built into the numerical control unit OPCN. In the Figure, PPC represents a pulse distributor for delivering control pulses Xp, Yp, Zp to a machine tool or the like, not shown, on the basis of output signals ΔX, ΔY, ΔZ from the numerical control unit OPCN. In addition, OPP represents a machine-side operator's panel which, at a mimimum, is an operating unit necessary for the start, stop or emergency-stop of the machine tool, or an operating unit which is frequently manipulated.

The numerical control system of the present invention is constructed as set forth above and will now be described for a case where operation information is set by operation information setting keys MDI of the numerical control operator's panel. First, the operator manipulates the operation information setting key OIS on the numerical control operator's panel MDI to select the operation information screen. Next, by using the numeric keys of the numerical control operator's panel MDI, the code corresponding to the character desired to be displayed on the screen of the display unit CRT is entered on the set operation information screen.

An example in which operation information is displayed on the screen of the display unit CRT will now be described.

FIG. 7 is an example of a display of operation information on the screen of the display unit CRT. If "SIGNAL 0" is coolant operation information, by way of example, then operating the cursor keys C1, C2, C3, C4 to bring the cursor to the left of OFF, then coolant can be turned off. If "SIGNAL 1" is, e.g., door operation information, then operating the cursor keys C1, C2, C3, C4 to bring the cursor to the left of ON will open a door.

According to the present invention, a special arrangement is adopted to thus display operation information on the screen of the display unit CRT. Specifically, it is so arranged that a character displayed on the screen of the display unit CRT is set by a code using numerals. This will now be described in accordance with an actual example. For instance, as shown in FIG. 8, a character—code correspondence table is prepared and the operation information to be displayed on the screen of the display unit CRT is entered based on this character—code correspondence table. By way of example, to display "SIGNAL 0" on the screen of the CRT, the operator successively manipulates the numeric keys on the numerical control operator's panel MDI in the following manner:

(1) A code (083) corresponding to "S" of "SIGNAL 0" is set.

(2) A code (073) corresponding to "I" of "SIGNAL 0" is set.

(3) A code (071) corresponding to "G" of "SIGNAL 0" is set.

(4) A code (078) corresponding to "N" of "SIGNAL 0" is set.

(5) A code (065) corresponding to "A" of "SIGNAL 0" is set.

(6) A code (032) corresponding to "L" of "SIGNAL 0" is set.

(7) A code (032) corresponding to the space in "SIGNAL 0" is set.

(8) A code (048) corresponding to "0" of "SIGNAL 0" is set.

Display of the operation information "SIGNAL 0" is thus completed. Thereafter, and in similar fashion, the operator sets the codes for the characters "SIGNAL 1", "SIGNAL 2", "SIGNAL 3", "SIGNAL 4", "SIGNAL 5", "SIGNAL 6" and "SIGNAL 7".

Figure 1:
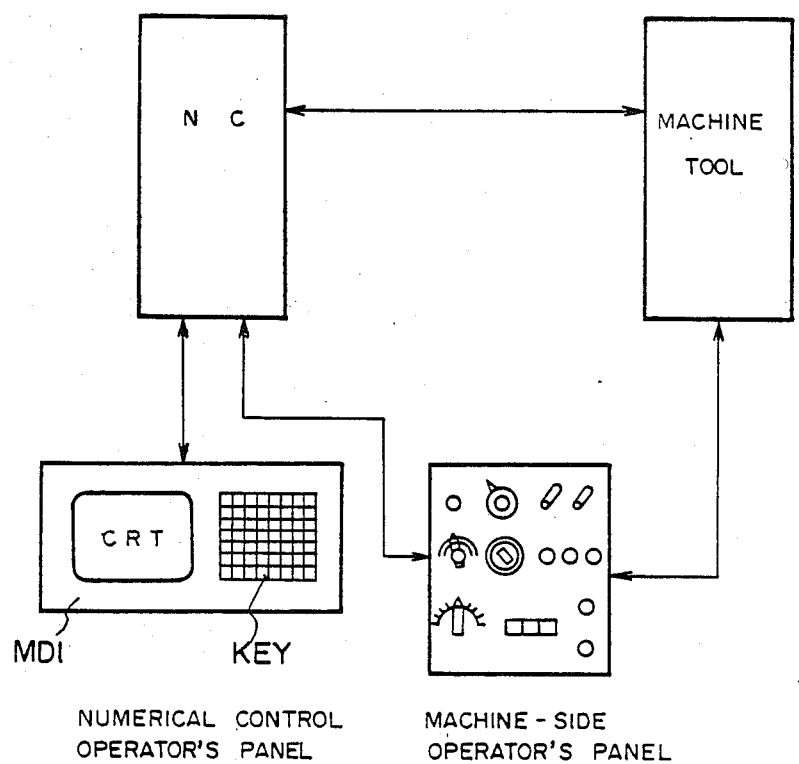
FIG. 1 is a block diagram of a conventional numerical control system.
Figure 2A:
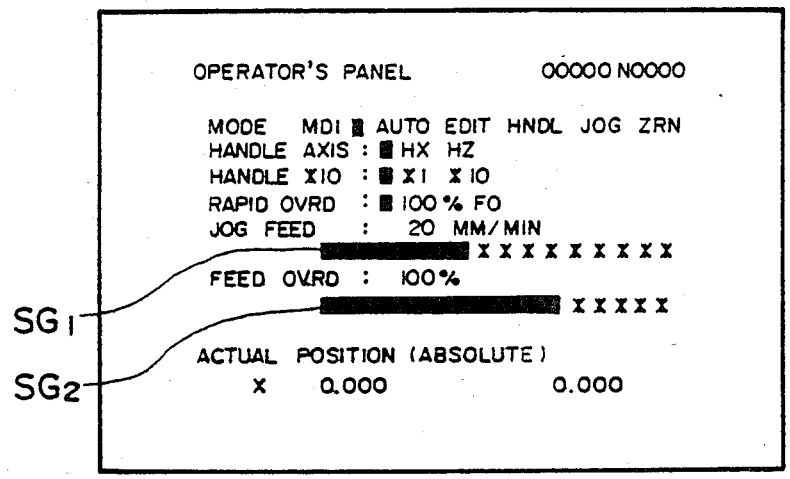
Figure 2B:
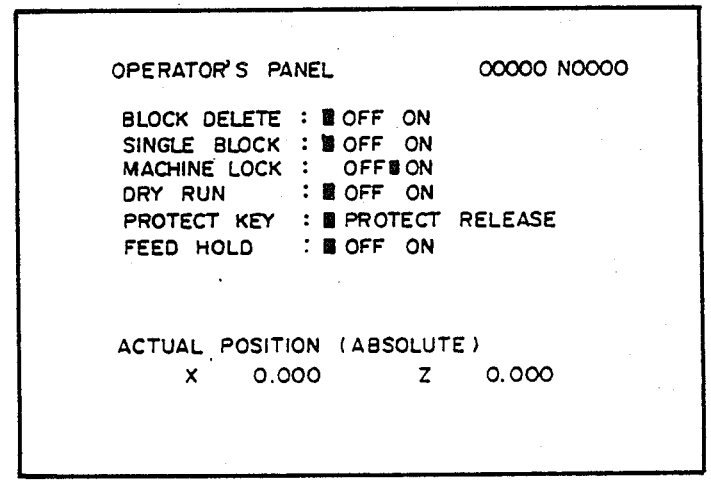

This display of operation information is only one example. It goes without saying that the operation information illustrated in FIGS. 2(A) and (B) can be entered through the above-described method by numeric keys using the above-mentioned character - code correspondence table.

When a code is thus set by the numeric keys on the numerical control operator's panel MDI, the numerical control unit OPCN into which the code is fed converts the code into a character and displays it on the screen of the display unit CRT.

The code conversion from numeral to character is performed by the code converter CC internally in the numerical control unit OPCN, and the numerical control unit OPCN displays the character corresponding to this code on the CRT screen of the manual data input unit MDI. Code conversion means generally is employed. For example, code conversion means such as employed in a word processor equipped with a CPU can be used. The operation information displayed on the display unit CRT by the foregoing operation is stored in the image memory IMM by the numerical control unit OPCN.

To enter the operation information thus set from the numerical control operator's panel MDI, the operator manipulates the operation information setting key OIS on the numerical control operator's panel MDI and then presses the page turning button PSB1 or PSB2 (PSB1 is for page incrementing and PSB2 for page decrementing). When the page turning button is held depressed, the images stored in the image memory IMM are sequentially displayed on the display unit CRT. The image memory IMM stores operation information covering several pages. Therefore, when a desired operation information image is displayed on the screen of the display unit CRT, the operator removes his finger from the page turning button PSB1 or PSB2 and subsequently operates the cursor keys C1 through C4 to position the cursor at each selection line and at the position of the prescribed item in each set line, as set forth above. If the operator then presses the input key IPT, the items of operation information are selected or set one after another and stored in the operation information memory OIM. This ends the entry of the operation information.

The numerical control unit controls the machine tool by performing predetermined numerical control processing on the basis of the numerical control program data thus entered from the numerical control operator's panel MDI.

Even though the present invention has been described based on the illustrated embodiment, the invention is not limited to the illustrated embodiment but can be modified in various ways without departing from the scope of the claims.

As set forth above, the present invention is so adapted that operation information necessary for numerical control can be applied as a numeric code to a numerical control unit by numeric keys disposed on the numerical control operator's panel. This makes it possible to greatly reduce the number of keys and switches on the numerical control panel and on the machine-side control panel. Accordingly, a machine tool that requires a large quantity of operation information is well-suited for use in a numerical control sysem for a robot.

We claim:

1. A numerical control method for a system including a numerical control unit for performing numerical control on the basis of operation information necessary for numerical control and having an operation information memory, and a numerical control operator panel with only numeric and cursor control keys and a display unit, the numerical control method comprising the following steps:
   (a) entering, into the numerical control unit, a numeric code of a character of operation information output by using the numeric keys provided on the numerical control operator's panel and converting the code into one or more text characters corresponding to the code;
   (b) displaying, by the numerical control unit, on the display unit, the operation information coverted into the one or more text characters by step (a);
   (c) storing, by the numerical control unit, in the operation information memory, the operation information displayed by step (b); and
   (d) performing, by the numerical control unit, numerical control processing on the basis of the operation information stored by step (c).

2. A numerical control method for a system including a numerical control unit for performing numerical control on the basis of operation information necessary for numerical control and having an image memory and an operation information memory, and a numerical control operator's panel with only numeric and cursor control keys and a display unit, the numerical control method comprising the following steps:
   (a) entering, into the numerical control unit, a character code of operation information output by using the numeric keys provided on the numerical control operator's panel and converting the code into one or more text characters corresponding to the code;
   (b) displaying, by the numerical control unit, on the display unit, the operation information converted into the one or more text characters by step (a);
   (c) storing, by the numerical control unit, in the image memory, the operation information displayed by step (b);
   (d) displaying, by the numerical control unit, on the display unit, the operation information stored in the image memory by step (c);
   (e) storing, by the numerical control unit, in the operation information memory, operation information selected by said numerical control operator's panel from among the operation information displayed on the display unit by step (d); and
   (f) performing, by the numerical control unit, numerical control processing on the basis of the operation information stored in the operation information memory by step (d).

3. A numerical control system for entering, for performing numerical control, operation information necessary for the numerical control, comprising:
   a numerical control operator's panel having only numeric and cursor control keys for outputting operation information;
   a numerical control unit, operatively connected to said numerical control operator's panel and having a code converter, for entering, and for converting into one or more text characters, a numeric code of operation information output by said numerical control operator's panel;
   a display unit, operatively connected to said numerical control unit and having a display screen, for displaying, on the display screen, the operation information converted into the one or more text characters by the code converter of said numerical control unit; and
   an operation information memory, operatively connected to said numerical control unit, for storing the operation information displayed on said display unit.

4. A numerical control system for entering, for performing numerical control, operation information necessary for numerical control, comprising:
   a numerical control operator's panel having only numeric and cursor control keys for outputting operation information
   a numerical control unit, operatively connected to said numerical control operator's panel and having a code converter, for entering, and for converting into one or more text characters, a numeric code of the operation information output by said numerical control operator's panel;
   a display unit, operatively connected to said numerical control unit and having a display screen, for displaying, on the display screen, the operation information converted into the one or more text characters by the code converter of said numerical control unit;
   an image memory, operatively connected to said numerical control unit, for storing the operation information displayed on said display unit; and an operation information memory, operatively connected to said numerical control unit, for storing operation information selected by said numerical control operator's panel from among the operation information stored in said image memory.

5. A numerical control system according to claim 3, wherein said display unit is provided on said numerical control operator's panel.

6. A numerical control system according to claim 3, wherein said operation information memory is included in said numerical control unit.

7. A numcrical control system according to claim 4, wherein said image memory is included in said numerical control unit.

8. A numerical control system according to claim 4 wherein said display unit is provided on said numerical control operator's panel.

9. A numverical control system according to claim 4 wherein said operation information memory is included in said numerical control unit.

* * * * *